(12) United States Patent
Okutsu et al.

(10) Patent No.: US 7,837,255 B1
(45) Date of Patent: Nov. 23, 2010

(54) VEHICLE SIDE DOOR STRUCTURE

(75) Inventors: Makoto Okutsu, Toyota (JP); Kensaku Harada, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 12/723,965

(22) Filed: Mar. 15, 2010

Related U.S. Application Data (63) Continuation of application No. PCT/JP2009/063101, filed on Jul. 22, 2009.

(51) Int. Cl.
*B60J 5/04* (2006.01)

(52) U.S. Cl. .............................. 296/187.12; 296/146.6; 280/735

(58) Field of Classification Search ............ 296/187.12, 296/146.6, 146.5; 49/502; 280/730.2, 735
See application file for complete search history.

(56) References Cited

U.S. PATENT DOCUMENTS

| | | | | |
|---|---|---|---|---|
| 5,281,780 A | * | 1/1994 | Haland ...................... 200/52 R |
| 5,934,703 A | * | 8/1999 | Mimura et al. .............. 280/734 |
| 6,460,648 B2 | * | 10/2002 | Kleinberg ................... 180/282 |
| 7,441,826 B2 | * | 10/2008 | Frank ....................... 296/146.6 |
| 7,614,685 B2 | * | 11/2009 | Oka ....................... 296/187.12 |
| 7,631,925 B2 | * | 12/2009 | Tanaka et al. ............ 296/146.6 |
| 2008/0315619 A1 | | 12/2008 | Oka |
| 2010/0090495 A1 | * | 4/2010 | Suzuki .................... 296/146.6 |

FOREIGN PATENT DOCUMENTS

| | | |
|---|---|---|
| JP | 09290705 A | 11/1997 |
| JP | 10329544 A | 12/1998 |
| JP | 3331861 | 7/2002 |
| JP | 2008222095 A | 9/2008 |
| JP | 2009001181 A | 1/2009 |

* cited by examiner

*Primary Examiner*—Jason S Morrow
(74) *Attorney, Agent, or Firm*—Gifford, Krass, Sprinkle, Anderson & Citkowski, P.C.

(57) ABSTRACT

Load input to an impact detector can be increased when a localized load is input, in comparison to when load is input to a comparatively wide region. In the vehicle side door structure 10, when a localized load is input, for example due to an impact to an outer panel 18 of a pole, or the like, to a length direction intermediate portion of an impact beam 26, via the outer panel 18, the outer panel 18 locally approaches the inner panel 20 side due to the length direction intermediate portion of the impact beam 26 bending, and a load is input to the vehicle width direction outer-edge portion of the sensing bracket 32. As a result, load is transmitted to the inner panel 20, via the horizontal section 32B and an inner-side joint section 32A of the sensing bracket 32, and also load (acceleration, displacement or the like) is input to an acceleration sensor 40 attached to the inner panel 20.

5 Claims, 10 Drawing Sheets

|  | Conventional (Without Sensing Bracket 32) | Present Invention (With Sensing Bracket 32) |
|---|---|---|
| [Pole Impact (Conditions 1)]<br>Pole Velocity: 24 km/h<br>Pole Intrusion Angle: 90°<br>Dummy Position: Neutral (AM50)<br>HIC: 1000 or less | Output G1 of acceleration sensor 40<br>(G1 > G3) | Output G4 of acceleration sensor 40<br>(G4 > G6) |
| [Low Velocity Pole Impact (Conditions 2)]<br>Pole Velocity: 0 to 32 km/h<br>Pole Intrusion Angle: 75°<br>Dummy Position: Neutral (AM50)<br>                Front-most (AF05)<br>HIC: 1000 or less | Output G2 of acceleration sensor 40 at pole velocity with HIC exceeding 1000 at which the airbag should be deployed<br>(G1 > G2) | Output G5 of acceleration sensor 40 at pole velocity with HIC exceeding 1000 at which the airbag should be deployed<br>(G5 >> G2) |
| [MDB Barrier Light Impact]<br>MDB Barrier Velocity: 20 km/h or 25 km/h | Output G3 of acceleration sensor 40<br>(G3 > G2) | Output G6 of acceleration sensor 40<br>(G6 < G5) |

VEHICLE SIDE DOOR STRUCTURE

CROSS-REFERENCE TO RELATED APPLICATIONS

This application is a Continuation of Application PCT/JP2009/063101 filed on Jul. 22, 2009 which is incorporated herein by reference.

TECHNICAL FIELD

The present invention relates to a vehicle side door structure applicable to a vehicle such as a car.

RELATED ART

A structure is disclosed in Patent Document 1 of an acceleration sensor attached to a side door, the acceleration sensor outputting a signal for determination of whether or not to deploy an airbag housed in the side door.

Patent Document 1: Japanese Patent Application Laid-Open (JP-A) No. 9-290705.

BACKGROUND OF THE INVENTION

Problem to be Solved by the Invention

When, for example, a localized load is input to a side door, due to a so-called side face pole impact or the like, a need arises to deploy an airbag, in order to protect a vehicle occupant from the side door locally intruding towards the vehicle compartment inside. In contrast thereto, there are cases when, for example, a load is input across a comparatively wide region of the side door, due to a light impact or the like, load is spread across a wide region of the vehicle body side section, and it is preferable not to deploy the airbag, since the amount of intrusion of the side door towards the vehicle compartment is small.

Consequently, there is a requirement to increase the load input to an acceleration sensor (impact detector) when a localized load is input to a side door, in comparison to when a load is input across a comparatively wide region.

An objective of the present invention is to obtain a vehicle side door structure that can increase the load input to an impact detector when a localized load is input, in comparison to when a load is input across a comparatively wide region.

SUMMARY OF THE INVENTION

A vehicle side door structure according to the invention of claim 1 includes: a door main body having an internal space formed between an outer panel disposed at an outer side in a vehicle width direction and an inner panel disposed at an inner side in the vehicle width direction of the outer panel; an impact detector attached to the inner panel; an impact beam having a length direction along a vehicle body front-rear direction, disposed at an outer panel side in the internal space, with both end portions of the impact beam in a longitudinal direction of the impact beam fixed to the door main body; and a load transmission member, having a length direction along the vehicle body front-rear direction, disposed at a bottom side of the vehicle body and at a rear side of the vehicle body in the internal space, the load transmission member comprising an inner-side joint section joined to the inner panel, a horizontal section extending from the inner-side joint section towards the outer side in the vehicle width direction, and an outer-side joint section extending from a vehicle width direction outer-edge portion of the horizontal section towards the bottom side of the vehicle body and joined to the inner panel, the vehicle width direction outer-edge portion of the horizontal section being disposed further toward the inner side in the vehicle width direction than a vehicle width direction outer-edge portion of the impact beam and facing the outer panel with a gap therebetween.

Note that the directionality recited in the claims is the directionality of the door main body in a closed state.

In the vehicle side door structure recited in claim 1, when, for example, a localized load is input, via the outer panel, to a length direction intermediate portion of the impact beam, the outer panel locally approaches the inner panel side due to bending of the length direction intermediate portion of the impact beam towards the inner side in the vehicle width direction, and a load is input to the vehicle width direction outer-edge portion of the load transmission member. As a result, load is transmitted, via the horizontal section and the inner-side joint section of the load transmission member, to the inner panel and a load (for example acceleration, displacement, or the like) is input to the impact detector attached to the inner panel.

However, when, for example, a load is input, via the outer panel, to a comparatively wide section of the impact beam, such a load is transmitted to the door main body via end portions of the impact beam in the longitudinal direction of the impact beam. Consequently, the door main body (outer panel and inner panel) intrudes towards the vehicle compartment. In such cases, since the amount of relative approach of the outer panel towards the inner panel is reduced, input of load from the outer panel to the load transmission member can be either avoided, or reduced. Consequently, input of load to the impact detector via the load transmission member can be either avoided, or reduced.

Consequently, the vehicle side door structure can increase the load input to an impact detector when a localized load is input, in comparison to when a load is input across a comparatively wide region.

The vehicle side door structure according to claim 2 is the vehicle side door structure of claim 1, wherein the inner panel includes: a vertical wall section joined to the inner-side joint section; a bottom wall section extending from a bottom edge portion of the vertical wall section towards the outer side in the vehicle width direction and facing an underside of the horizontal section; and a pendent wall section extending from a vehicle width direction outer-edge portion of the bottom wall section towards the bottom side of the vehicle body and joined to a bottom side of the outer-side joint section, and an upper side of the outer-side joint section protruding out further to the outer side in the vehicle width direction than the bottom side of the outer-side joint section.

In the vehicle side door structure recited in claim 2, since the upper side of the outer-side joint section of the load transmission member protrudes out further to the outer side in the vehicle width direction (the outer panel side) than the bottom side of the outer-side joint section, the vehicle width direction outer-edge portion of the horizontal section can be disposed further to the outer panel side than the bottom side of the outer-side joint section (namely the portion joined to the pendent wall section of the inner panel). As a result, when the outer panel approaches the inner panel side due to input of a localized load, the outer panel can be made to impact with the vehicle width direction outer-edge portion of the horizontal section at an early stage, and a load input to the impact detector, via the horizontal section, can be made at an early stage.

The vehicle side door structure according to the invention, wherein a bead is provided to the horizontal section, the bead extending along the vehicle width direction so as to form an undulation in a vehicle body vertical direction.

In the vehicle side door structure the rigidity of the horizontal section against load in the vehicle width direction can be increased by provision of the bead to the horizontal section of the load transmission member. Consequently, the transmission efficiency of load via the horizontal section can be improved.

The vehicle side door structure, wherein the inner panel includes: a vertical wall section joined to the inner-side joint section; a bottom wall section extending from a bottom edge portion of the vertical wall section towards the outer side in the vehicle width direction and facing an underside of the horizontal section; and a pendent wall section, extending from a vehicle width direction outer-edge portion of the bottom wall section towards the bottom side of the vehicle body and joined to a bottom side of the outer-side joint section, and the horizontal section is disposed with a separation from the bottom wall section towards an upper side of the vehicle body, by an upper portion of the outer-side joint section being disposed projecting out further to the upper side of the vehicle body than the bottom wall section.

In the vehicle side door structure, the upper side of the outer-side joint section of the load transmission member is disposed projecting out further to the upper side of the vehicle body than the bottom wall section of the inner panel. As a result, the horizontal section of the load transmission member is disposed with a separation from the bottom wall section of the inner panel towards the upper side of the vehicle body. Consequently, for example, even when it is difficult to dispose the impact detector at a low position due to, for example, the shape of the inner panel or the placement of other members, the horizontal section of the load transmission member can be disposed in the vicinity of the impact detector. As a result, for example, the transmission efficiency of load to the impact detector, via the horizontal section, can be improved.

The vehicle side door structure, wherein the impact detector is attached to the inner panel via an attachment member that is joined to a vehicle width direction inner face of the inner panel, with the attachment member, the inner panel, and the inner-joint section joined together and superimposed on each other in a sheet thickness direction of the inner panel.

In the vehicle side door structure recited in claim 5, the attachment member to which the impact detector is attached, the inner panel, and the inner-side joint section of the load transmission member are joined together superimposed on each other in the sheet thickness direction of the inner panel. As a result, the load input to the load transmission member can be efficiently input to the impact detector.

The vehicle side door structure according to the invention is a vehicle side door structure including: a door main body having an internal space formed between an outer panel disposed at an outer side in a vehicle width direction and an inner panel disposed at an inner side in the vehicle width direction of the outer panel; an impact detector attached to the inner panel; an impact beam having a length direction along a vehicle body front-rear direction, disposed at an outer panel side in the internal space, with both end portions of the impact beam in a longitudinal direction of the impact beam fixed to the door main body; and a load transmission member, having a length direction along the vehicle body front-rear direction, disposed at a bottom side of the vehicle body and at a rear side of the vehicle body in the internal space, disposed independently from the impact beam, with a vehicle width direction inner edge portion of the load transmission member joined to the inner panel, and vehicle width direction outer edge portion of the load transmission member disposed further toward the inner side in the vehicle width direction than a vehicle width direction outer edge portion of the impact beam and facing the outer panel with a gap therebetween.

In the vehicle side door structure, when a localized load is input to a length direction intermediate portion of the impact beam via the outer panel, the outer panel locally approaches the inner panel side due to bending of the length direction intermediate portion of the impact beam towards the inner-side in the vehicle width direction, and a load is input to the vehicle width direction outer-edge portion of the load transmission member. As a result, load is transmitted to the inner panel via the load transmission member, and a load (acceleration, displacement, or the like) is input to the impact detector attached to the inner panel.

However, when, for example, a load is input via the outer panel to a comparatively wide region of the impact beam, such a load is transmitted to the door main body via end portions of the impact beam in the longitudinal direction of the impact beam. Consequently, the door main body (outer panel and inner panel) intrudes towards the vehicle compartment inside. In such cases, since the amount of relative approach of the outer panel towards the inner panel is reduced, input of load from the outer panel to the load transmission member can be either avoided, or reduced. Consequently, input of load to the impact detector via the load transmission member can be either avoided, or reduced.

Consequently, the vehicle side door structure can increase the load input to an impact detector when a localized load is input, in comparison to when a load is input across a comparatively wide region.

A vehicle side door structure according to the invention is a vehicle side door structure including: a door main body having an internal space formed between an outer panel disposed at an outer side in a vehicle width direction and an inner panel disposed at an inner side in the vehicle width direction of the outer panel; an impact detector attached to the inner panel; an impact beam having a length direction along a vehicle body front-rear direction, disposed at an outer panel side in the internal space, with both end portions of the impact beam in a longitudinal direction of the impact beam fixed to the door main body; and a load transmission member, having a length direction along the vehicle body front-rear direction, disposed at a bottom side of the vehicle body and at a rear side of the vehicle body in the internal space, with a vehicle width direction inner edge portion of the load transmission member joined to the inner panel, and a vehicle width direction outer edge portion of the load transmission member disposed further toward the inner side in the vehicle width direction than the impact beam and facing the outer panel with a gap therebetween.

In the vehicle side door structure, when a localized load is input to a length direction intermediate portion of the impact beam via the outer panel, the outer panel locally approaches the inner panel side due to bending of the length direction intermediate portion of the impact beam towards the inner-side in the vehicle width direction, and a load is input to the vehicle width direction outer-edge portion of the load transmission member. As a result, load is transmitted to the inner panel via the load transmission member, and a load (acceleration, displacement, or the like) is input to the impact detector attached to the inner panel.

However, when, for example, load is input via the outer panel to a comparatively wide region of the impact beam, such a load is transmitted to the door main body via end portions of the impact beam in the longitudinal direction of the impact beam. Consequently, the door main body (outer panel and inner panel) intrudes towards the vehicle compartment. In such cases, since the amount of relative approach of the outer panel towards the inner panel is reduced, input of load from the outer panel to the load transmission member can be either avoided, or reduced. Consequently, input of load to the impact detector via the load transmission member can be either avoided, or reduced.

Consequently, the vehicle side door structure can increase the load input to an impact detector when a localized load is input, in comparison to when a load is input across a comparatively wide region.

EFFECT OF THE INVENTION

As explained above, in the vehicle side door structure according to claim 1, the load input to an impact detector can be increased when a localized load is input, in comparison to when a load is input across a comparatively wide region.

The vehicle side door structure according to claim 2 can input load to the impact detector at an early stage, via the horizontal section of the load transmission member.

The vehicle side door structure according to claim 3 can increase transmission efficiency of load via the horizontal section of the load transmission member.

The vehicle side door structure according to claim 4 can dispose the horizontal section of the load transmission member in the vicinity of the impact detector.

The vehicle side door structure according to claim 5 can efficiently input, to the impact detector, load that has been input to the load transmission member.

The vehicle side door structure according to claim 6 can increase the load input to an impact detector when a localized load is input, in comparison to when a load is input across a comparatively wide region.

The vehicle side door structure according to claim 7 can increase the load input to an impact detector when a localized load is input, in comparison to when a load is input across a comparatively wide region.

BEST MODE OF IMPLEMENTING THE INVENTION

First Exemplary Embodiment

Explanation follows regarding a first exemplary embodiment of the present invention, with reference to FIG. 1 to FIG. 9. Note that in each of the drawings, the arrow FR indicates the vehicle body front direction, the arrow UP indicates the vehicle body upper-side direction, the arrow IN indicates the vehicle width inner-side direction, and the arrow OUT indicates the vehicle width outer-side direction.

Figure 1:
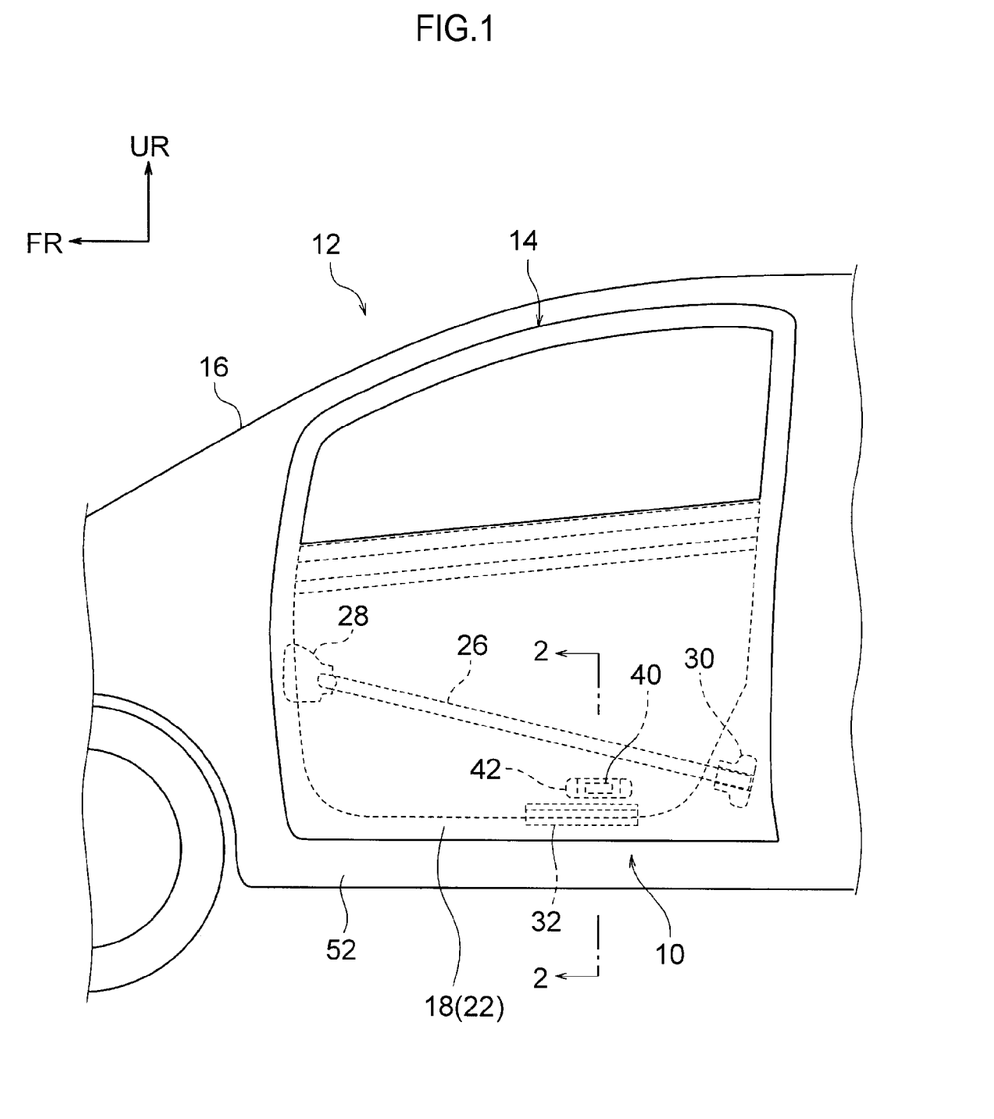
FIG. 1 is a side view showing a partial configuration of a car configured by application of the vehicle side door structure according to a first exemplary embodiment of the present invention.

FIG. 1 is a side view showing a partial configuration of a car 12, to which the vehicle side door structure 10 according to the first exemplary embodiment of the present invention has been applied. As shown in this figure, the car 12 is equipped with a side door 14. The side door 14 is a door for opening and closing off a door opening (not shown in the figures) formed in a side portion of the car body 16, employed by a vehicle occupant to get in and out of the vehicle. In the state of closing off the above described door opening (in the closed state of the side door 14, the state shown in FIG. 1) the side door 14, the width direction (the door width direction) matches the vehicle body front-rear direction, and the thickness direction (door thickness direction) matches the vehicle width direction. Note that the directionality relating to the side door 14 employed in the following explanation is the directionality when the side door 14 is in the closed state.

Figure 2:
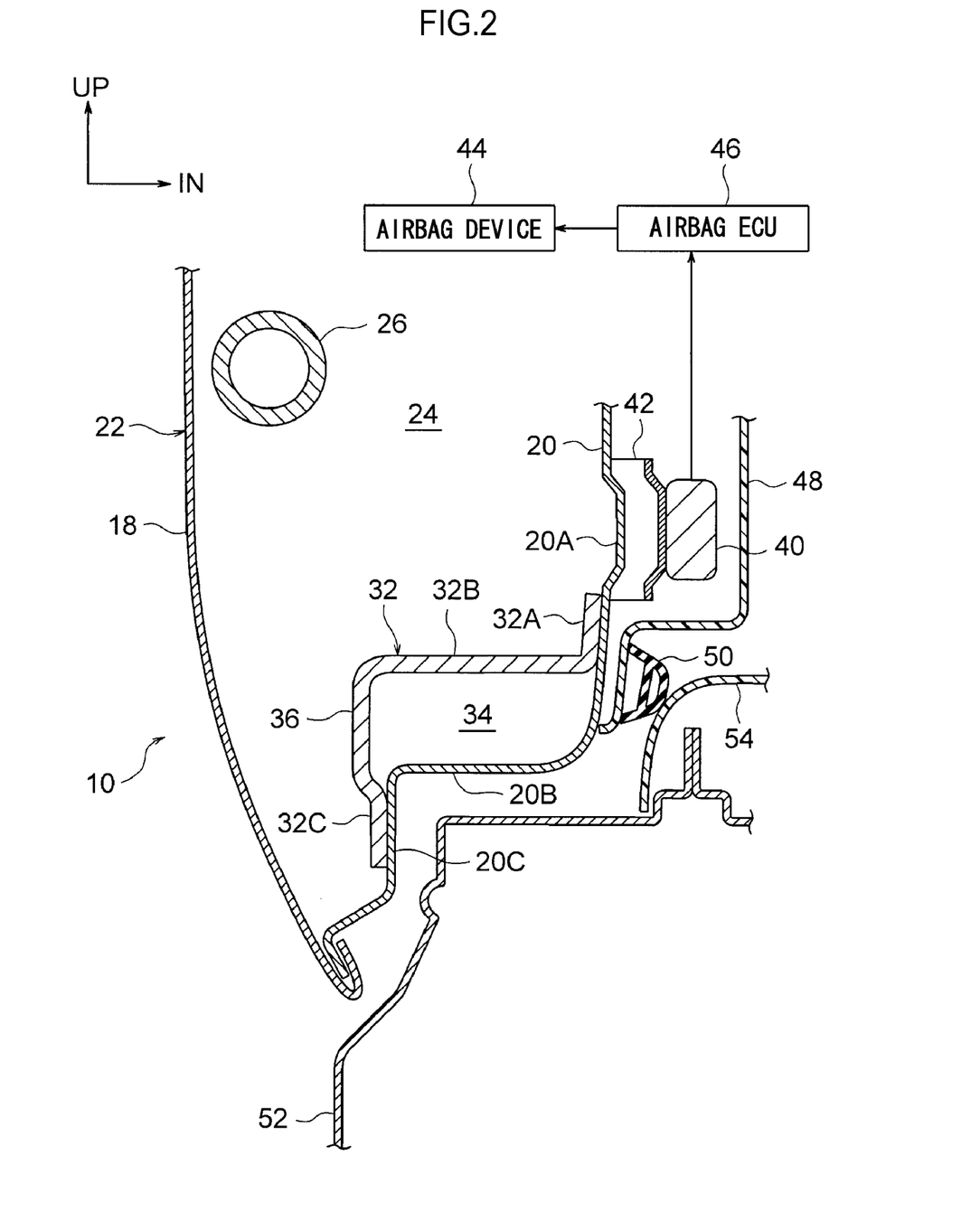
FIG. 2 is a cross-section taken on line 2-2 of FIG. 1.

As shown in FIG. 2, the side door 14 is equipped with a door main body 22, configured from an outer panel 18 disposed at the outer side in the vehicle width direction, and an inner panel 20, disposed at the inner side in the vehicle width direction of the outer panel 18. The outer panel 18 and the inner panel 20 are joined together by peripheral edge portions thereof being hemming processed.

The inner panel 20 has a vertical wall section 20A that extends from the vicinity of a vertical direction central portion of the door main body 22 towards the bottom edge side of the door main body 22, a bottom wall section 20B that extends from the bottom edge portion of the vertical wall section 20A towards the outer side in the vehicle width direction, and a pendent wall section 20C that extends from the vehicle width direction outer-edge portion of the bottom wall section 20B towards the bottom side of the vehicle body. An internal space 24 is formed between the inner panel 20 and the outer panel 18, and an impact beam 26 is provided as a reinforcement member within the internal space 24.

The impact beam 26 is formed in a long pipe shape, with the length direction thereof along the vehicle front-rear direction, and the impact beam 26 is disposed within the internal space 24 at the outer panel 18 side. End portions of the impact beam 26 in the longitudinal direction of the impact beam 26 are fixed to the inner panel 20 via extensions 28, 30 (see FIG. 1). Note that in the present first exemplary embodiment, the impact beam 26 is disposed inclined so as to become progressively lower towards the outer side in the vehicle width direction.

Furthermore, a sensing bracket 32 is provided as a load transmission member within the internal space 24. The sensing bracket 32 is formed in an elongated shape, from sheet metal of sheet thickness thicker than that of the outer panel 18 and the inner panel 20, with a length direction that is along the vehicle front-rear direction. The sensing bracket 32 is disposed at the bottom side of the vehicle body and the rear side of the vehicle body within the internal space 24.

An inner-side joint section 32A is provided at the inner side edge portion in a vehicle width direction of the sensing bracket 32. The inner-side joint section 32A is joined to the vertical wall section 20A of the inner panel 20 by spot welding. A horizontal section 32B extends out from the bottom edge portion of the inner-side joint section 32A, towards the outer side in the vehicle width direction. An outer-side joint section 32C extends out from the vehicle width direction outer-edge portion of the horizontal section 32B, towards the bottom side of the vehicle body. The sensing bracket 32 forms a crank shape when viewed in cross-section from the vehicle front-rear direction.

The bottom portion side of the outer-side joint section 32C is joined to the pendent wall section 20C of the inner panel 20 by spot welding, and the upper portion side of the outer-side joint section 32C is disposed so as to project out from further towards the upper side of the vehicle body than the bottom wall section 20B of the inner panel 20. Consequently, the horizontal section 32B of the sensing bracket 32 is disposed separated, towards the upper side of the vehicle body, from the bottom wall section 20B of the inner panel 20, with a closed space 34 formed between the sensing bracket 32 and the inner panel 20. Note that in the present first exemplary embodiment, the separation distance between horizontal section 32B and the bottom wall section 20B is set to be about 10 mm to about 50 mm.

Furthermore, the upper portion side of the outer-side joint section 32C is a protruding portion 36 that protrudes out (projects) towards the outer side in the vehicle width direction (the outer panel 18 side). As a result, the vehicle width direction outer-edge portion of the horizontal section 32B (the vehicle width direction outer-edge portion of the sensing bracket 32) is disposed further to the outer panel 18 side than the outer-side joint section 32C. However, the vehicle width direction outer-edge portion of the horizontal section 32B is disposed further to the inner side in the vehicle width direction than the vehicle width direction outer-edge portion of the impact beam 26, and faces the outer panel 18 with a gap therebetween.

Figure 3:
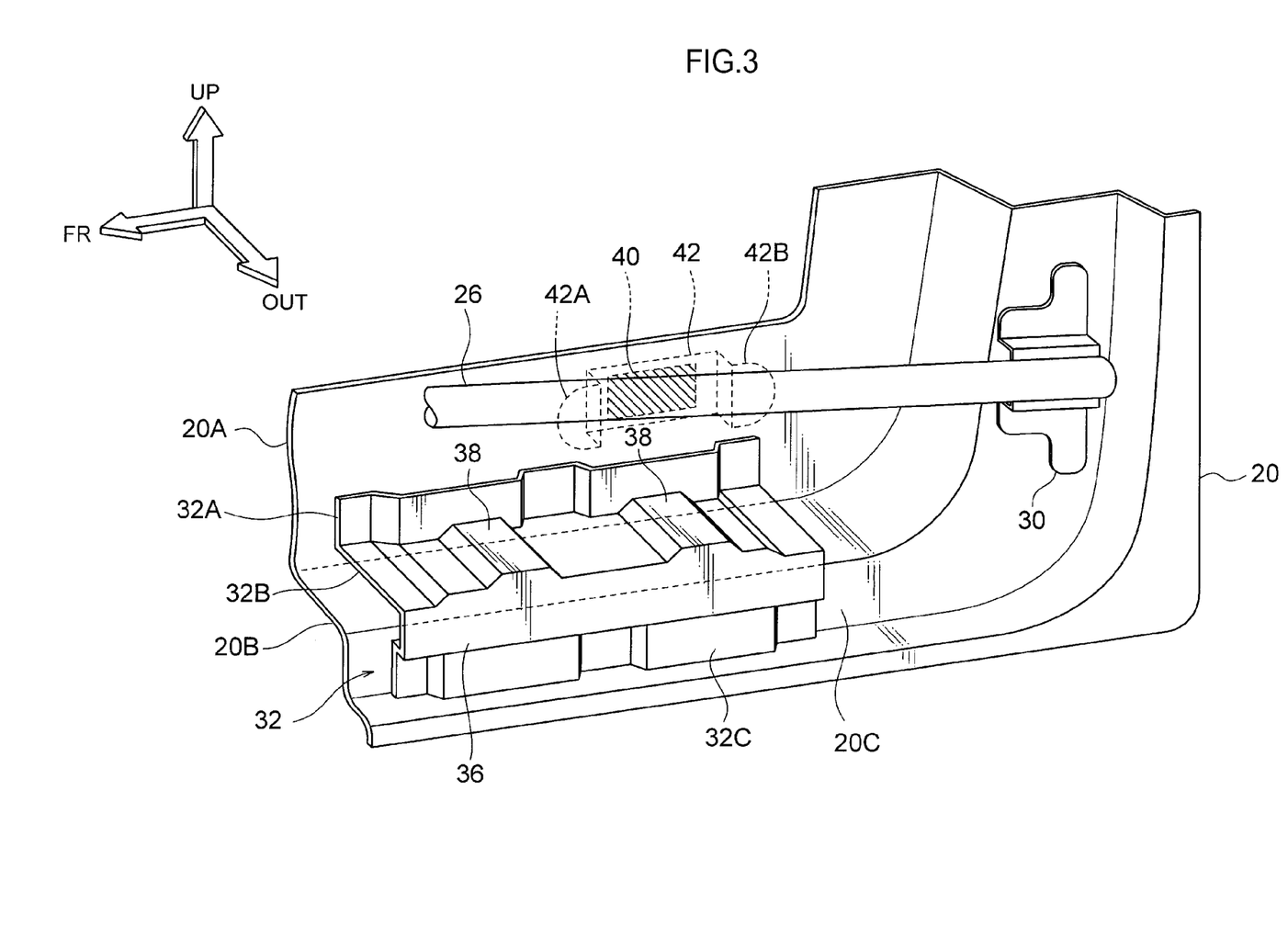
FIG. 3 is a perspective view showing relevant portions of a vehicle side door structure according to the first exemplary embodiment of the present invention.

Furthermore, as shown in FIG. 3, plural (in this case two) beads 38 (not shown in the figures other than FIG. 3) are provided to the horizontal section 32B, projecting out to the upper side of the vehicle body. The beads 38 are formed so as to have a portion of a horizontal section that protrudes out towards the upper side of the vehicle body, and extend along the vehicle width direction. Note that in another exemplary embodiment, beads may project out to the bottom side of the vehicle body of the horizontal section 32B.

An acceleration sensor 40 is disposed, as an impact detector, at the inner side in the vehicle width direction of the inner panel 20. The acceleration sensor 40 is attached to the inner panel 20 via an attachment bracket 42 (attachment member) formed in an elongated shape from sheet metal. The attachment bracket 42 has a length direction along the vehicle front-rear direction and is disposed at the bottom side of the vehicle body and at the vehicle body of the inner panel 20. More precisely, the attachment bracket 42 is disposed to the rear side of the inner side in the vehicle width direction and the upper side of the vehicle body with respect to the rear side portion of the vehicle body of the sensing bracket 32, and the bottom edge of the attachment bracket 42 is disposed in the vicinity of the upper edge of the inner-side joint section 32A of the sensing bracket 32.

The attachment bracket 42 is joined to the inner panel 20 by spot welding at a front edge joining section 42A and a rear edge joining section 42B (see FIG. 3). The length direction intermediate portion of the attachment bracket 42, between the front edge joining section 42A and the rear edge joining section 42B, protrudes out towards the inner side in the vehicle width direction, and the acceleration sensor 40 is attached to the face of the attachment bracket 42 at the inner side in the vehicle width direction of the protruding portion.

The acceleration sensor 40 is configured to output a signal according to the acceleration in the vehicle width direction. The acceleration sensor 40, as shown in FIG. 2, is electrically connected to an airbag ECU 46, serving as control means that controls actuation (deployment and non-deployment) of an airbag device 44. The airbag ECU 46, for example, is configured to output an actuation signal to the airbag device 44 when input with a signal of a threshold value or greater from the acceleration sensor 40. The airbag device 44 is a side impact airbag device, such as a side airbag, a curtain airbag, or the like.

Note that in the present exemplary embodiment, the threshold value of the output of the acceleration sensor 40 is set such that in a pole side impact (pole velocity: 0 to 32 km/h, pole intrusion angle: 75°, seated position of dummy employed for crash test: neutral (AM50) and front-most (AF05)), the output of the acceleration sensor 40 corresponding to when the airbag of the airbag device 44 should be deployed is the pole velocity when the Head Injury Criteria (HIC) of the crash dummy exceeds a specific value (1000). In the following explanation, the pole velocity when the HIC exceeds the specific value (1000) at which the airbag should be deployed is referred to as "low velocity".

The acceleration sensor 40 and the attachment bracket 42 described above are covered by a door trim 48 made from a resin and attached to the inner side in the vehicle width direction of the inner panel 20. A weather strip 50 is attached to a bottom edge portion of the door trim 48. The weather strip 50 is configured to be in close contact with a scarf plate 52 made of resin and attached to an upper portion of a rocker 52 of the car body 16.

Explanation follows regarding the operation and effect of the first exemplary embodiment of the present invention.

In the vehicle side door structure 10 configured as described above, when a side impact occurs to the side door 14, an impact load is input to the acceleration sensor 40. The acceleration sensor 40 outputs a signal to the airbag ECU 46 according to the input impact load (acceleration). When the signal from the acceleration sensor 40 is less than the threshold value, the airbag ECU 46 prohibits actuation of the airbag device 44, and if the signal from the acceleration sensor 40 is the threshold value or greater, the airbag ECU 46 actuates the airbag device 44.

Figure 4A:
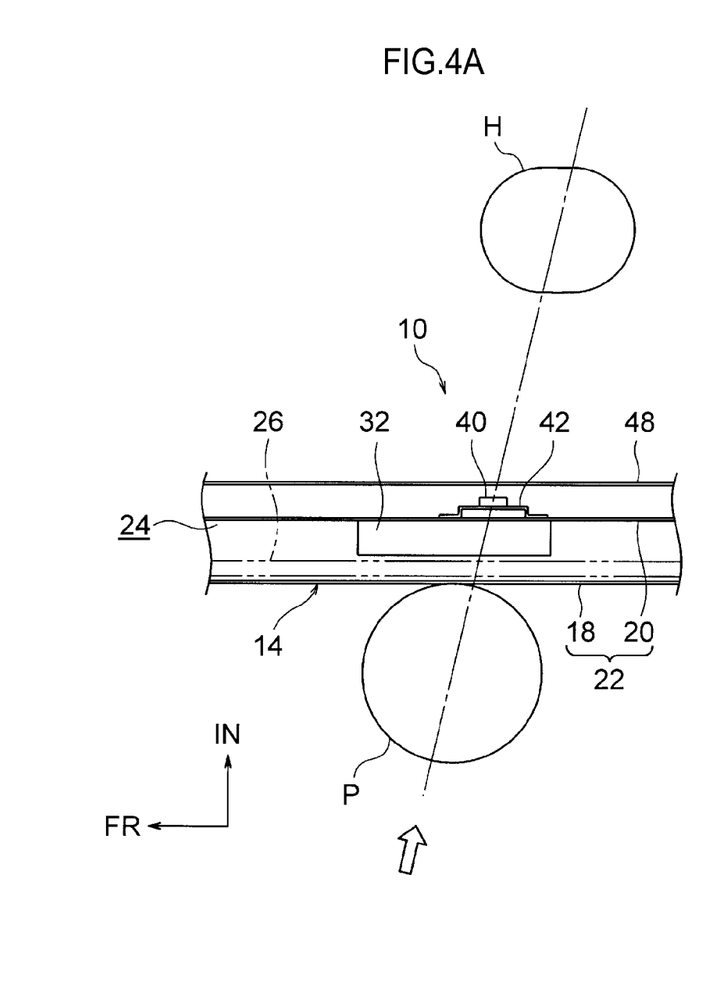
FIG. 4A is a horizontal cross-section showing a state in which a pole has impacted a side door according to the first exemplary embodiment of the present invention.
Figure 4B:
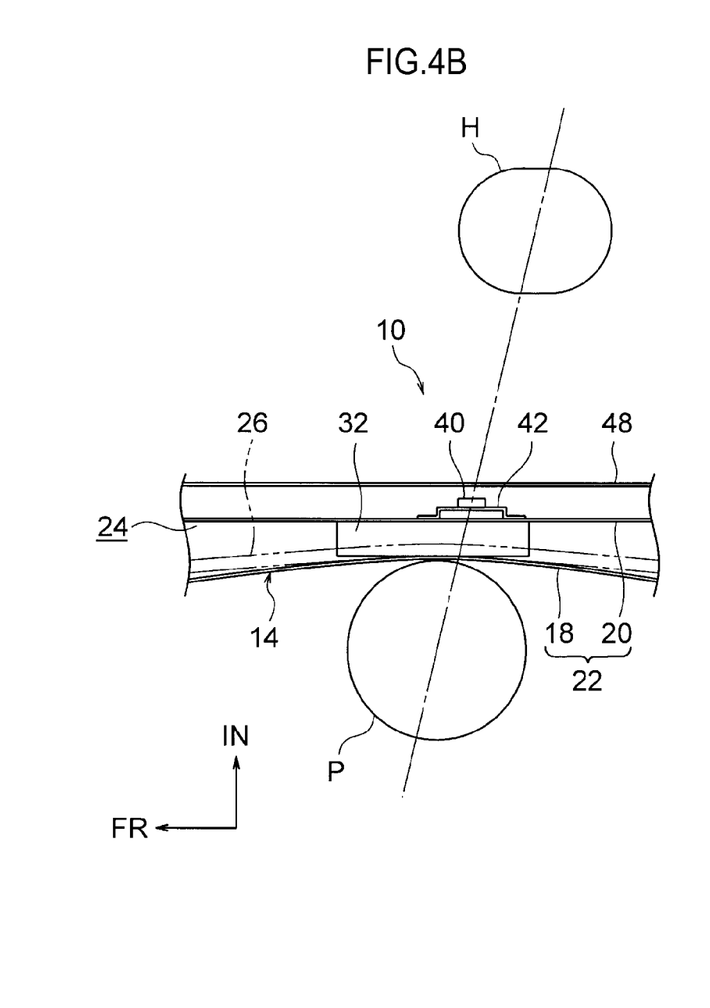
FIG. 4B is a horizontal cross-section showing a state in which a length direction intermediate portion of an impact beam has been bent by the impact of the pole.
Figure 5A:
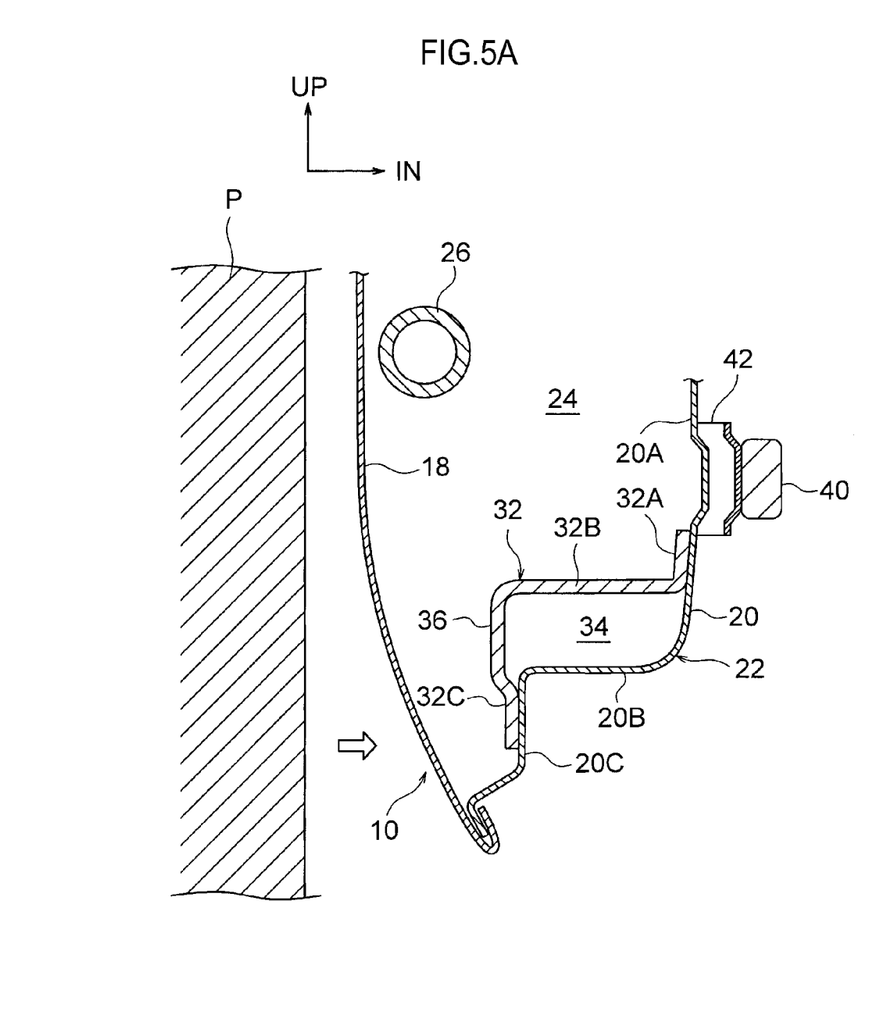
FIG. 5A is a vertical cross-section showing a state just prior to a pole impacting a side door according to the first exemplary embodiment of the present invention.
Figure 5B:
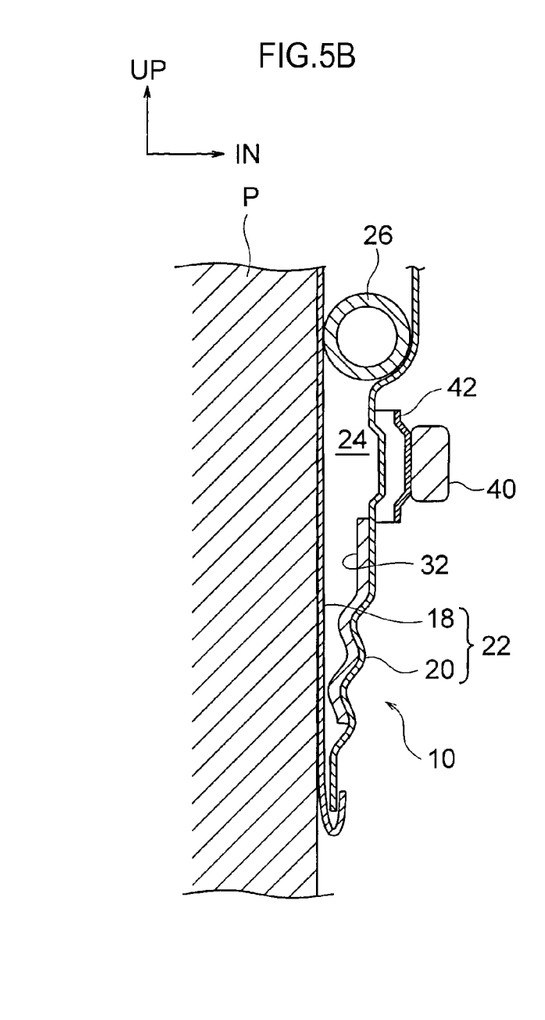
FIG. 5B is a vertical cross-section showing a state in which the side door has collapsed due to the impact of the pole.

When, for example, the impact of a pole P to the side door 14 is at low velocity, as shown in FIG. 4A, a localized load is input, via the outer panel 18, to a length direction intermediate portion of the impact beam 26. In such cases, as shown in FIG. 4B, due to bending towards the inner side in the vehicle width direction of the length direction intermediate portion of the impact beam 26, the outer panel 18 locally approaches towards the inner panel 20 side, and, via the outer panel 18, the pole P impacts the vehicle width direction outer-edge portion of the sensing bracket 32 (the vehicle width direction outer-edge portion of the horizontal section 32B). As a result, load is transmitted to the inner panel 20 via the horizontal section 32B and the inner-side joint section 32A (the inner side edge portion in the vehicle width direction of the sensing bracket 32) of the sensing bracket 32, and a load (acceleration, displacement or the like) is input to the acceleration sensor 40 attached to the inner panel 20. Note that in FIG. 4A and FIG. 4B, the symbol H indicates the head of a vehicle occupant.

However, when the pole impact is like that described above, as shown in FIG. 5A and FIG. 5B, since the sensing bracket 32 collapses in the vehicle width direction along with a portion of the door main body 22, the impact load is efficiently input to the acceleration sensor 40. As a result, the acceleration sensor 40 outputs a signal of the threshold value or greater to the airbag ECU 46, and the airbag ECU 46 actuates the airbag device 44.

Figure 6A:
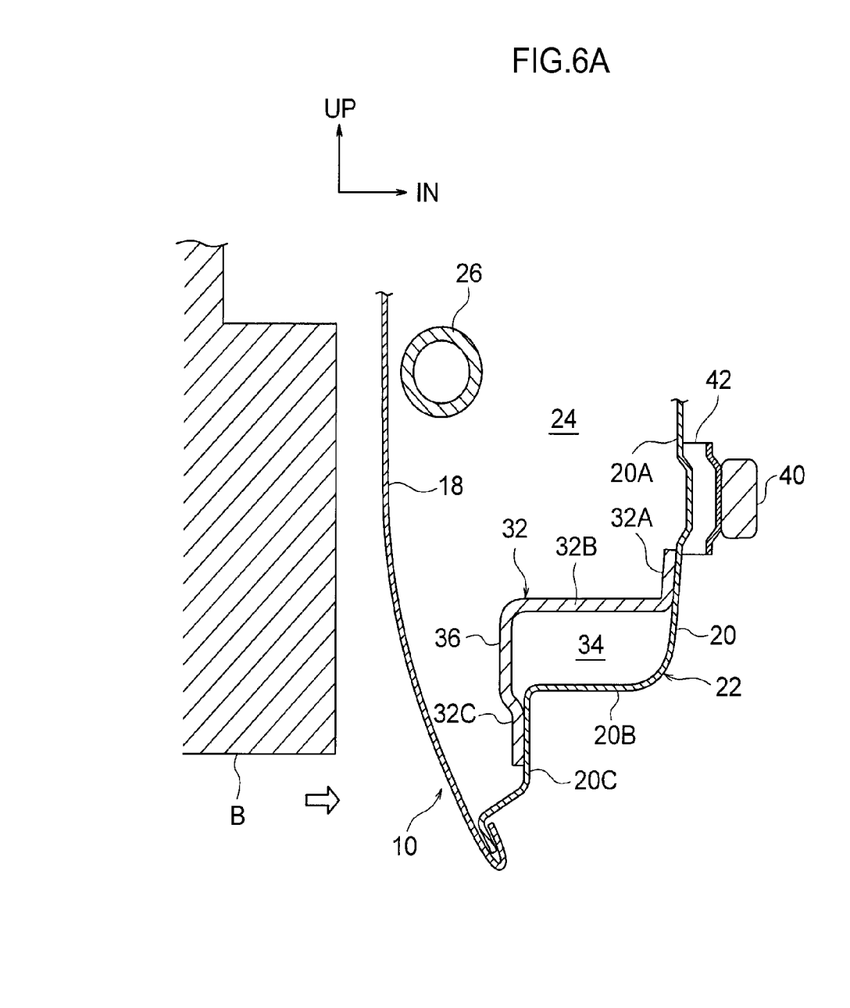
FIG. 6A is a vertical cross-section showing a state just prior to an MDB impacting a side door according to the first exemplary embodiment of the present invention.
Figure 6B:
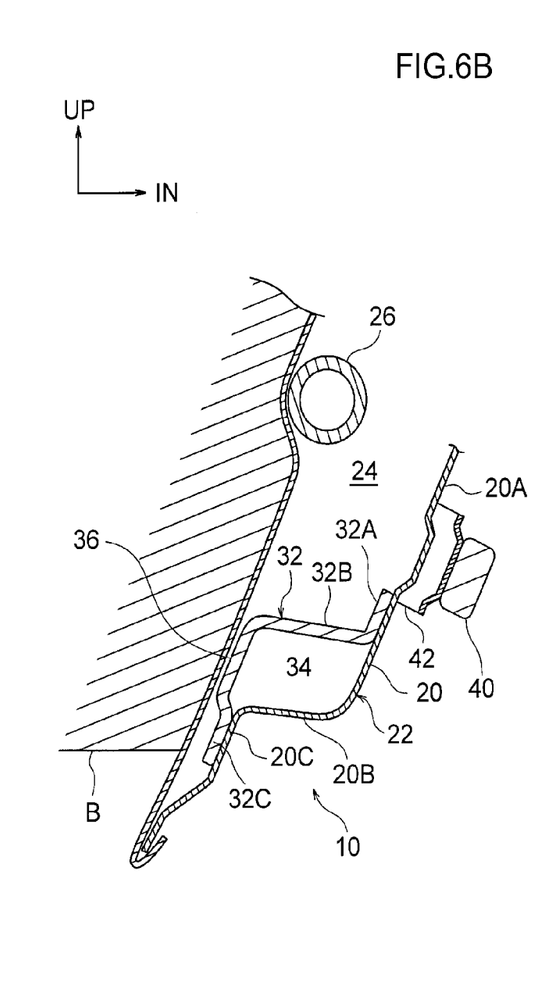
FIG. 6B is a vertical cross-section showing a state in which the side door has been pushed in towards the inner side in the vehicle width direction due to the impact with the MDB.

However, for example, when there is a light impact to the side door 14 by a barrier B (Moving Deformable Barrier (MDB)) shown in FIG. 6A, load is input, via the outer panel 18, over a comparatively wide region of the impact beam 26. The load input to the impact beam 26 is transmitted to the door main body 22 via the two end portions of the impact beam 26 in the longitudinal direction of the impact beam 26. As a result, as shown in FIG. 6B, the door main body 22 (the outer panel 18 and the inner panel 20) intrudes towards the inner-side in the vehicle width direction. In such a case, since the amount by which the outer panel 18 relatively approaches the inner panel 20 is reduced, input of load, via the outer panel 18, to the sensing bracket 32 is either avoided or reduced. Input of load, via the sensing bracket 32, to the acceleration sensor 40 is thereby either avoided or reduced. As a result, for example, when the impact velocity of the barrier B is 20 km/h or 25 km/h, the output of the acceleration sensor 40 is suppressed to less than that of the threshold value, and the airbag ECU 46 prohibits actuation of the airbag device 44. Note that in such cases, the impact load is transmitted to the acceleration sensor 40 along the path of the impact beam 26→the extension 30→the inner panel 20→the attachment bracket 42→the acceleration sensor 40.

Namely, in the vehicle side door structure 10 according to the present first exemplary embodiment, when a localized load is input, as in a low velocity pole impact, the input of load to the acceleration sensor 40 is greater in comparison to a case when there is a load input over a comparatively wide region as in a barrier impact. In other words, the present vehicle side door structure 10 is of a configuration such that the impact load is efficiently transmitted to the acceleration sensor 40 for a low velocity pole impact, and impact load is not readily transmitted to the acceleration sensor 40 for a light impact (small scale impact). As a result, the vehicle occupant is protected in a low velocity pole impact by ensuring airbag deployment is performed, and airbag deployment can be avoided for a light impact.

Figure 7:
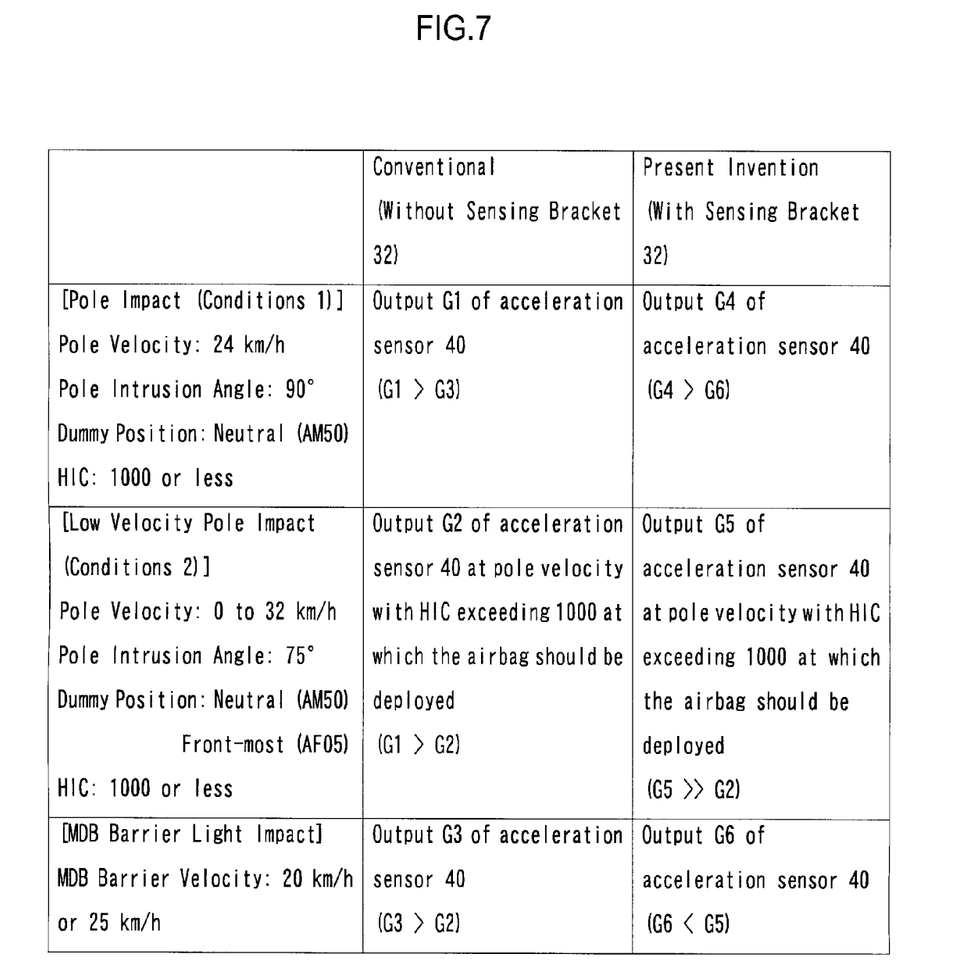
FIG. 7 is a table showing the relationship between the presence or absence of a sensing bracket according to the first exemplary embodiment of the present invention, and the response of an acceleration detector.

FIG. 7 illustrates in a table the relationship between the sensing bracket 32 being present or not, and the output of the acceleration sensor 40. As shown in FIG. 7, when the sensing bracket 32 is not provided, if output G1 of the acceleration sensor 40 in Conditions 1 of a pole impact is set as the threshold value, then output G3 of the acceleration sensor 40 in an MDB barrier light impact is the equal to or less than the threshold value G1, so deployment of the airbag during an MDB barrier light impact can be prevented. However, in the low velocity pole impact of Conditions 2, the output G2 of the acceleration sensor 40, at this pole velocity where the HIC exceeds 1000 and the airbag should be deployed, is less than or equal to the threshold value G1, and cases where the airbag cannot be deployed occur.

In contrast thereto, when the sensing bracket 32 is provided, the output G5 of the acceleration sensor 40, with the pole velocity at which the airbag should be deployed where the HIC exceeds 1000, is sufficiently greater than the above output G2, and, for example, by setting the threshold value at output G5, the airbag can be deployed in a low velocity pole impact of Conditions 2. Note that value of the output G5 is a different value depending, for example, on the type of car, and since there are cases where G4>G5>G6>G2, or G5>G4>G6>G2, the threshold value of the acceleration sensor 40 needs to be appropriately set according, for example, to the type of car.

Figure 8:
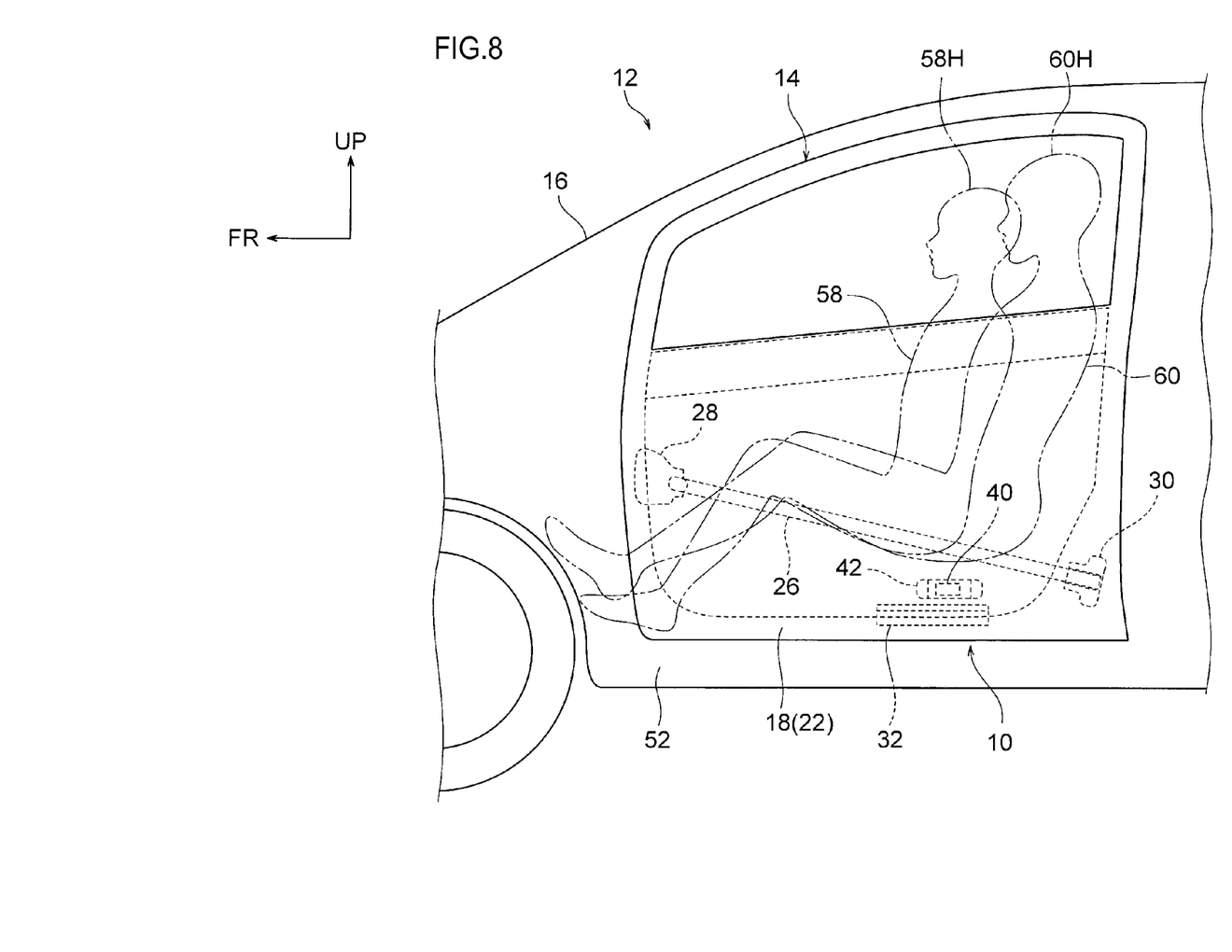
FIG. 8 is a side view, corresponding to FIG. 1, for explaining the positional relationships between a sensing bracket according to the first exemplary embodiment of the present invention and a vehicle occupant.
Figure 9:
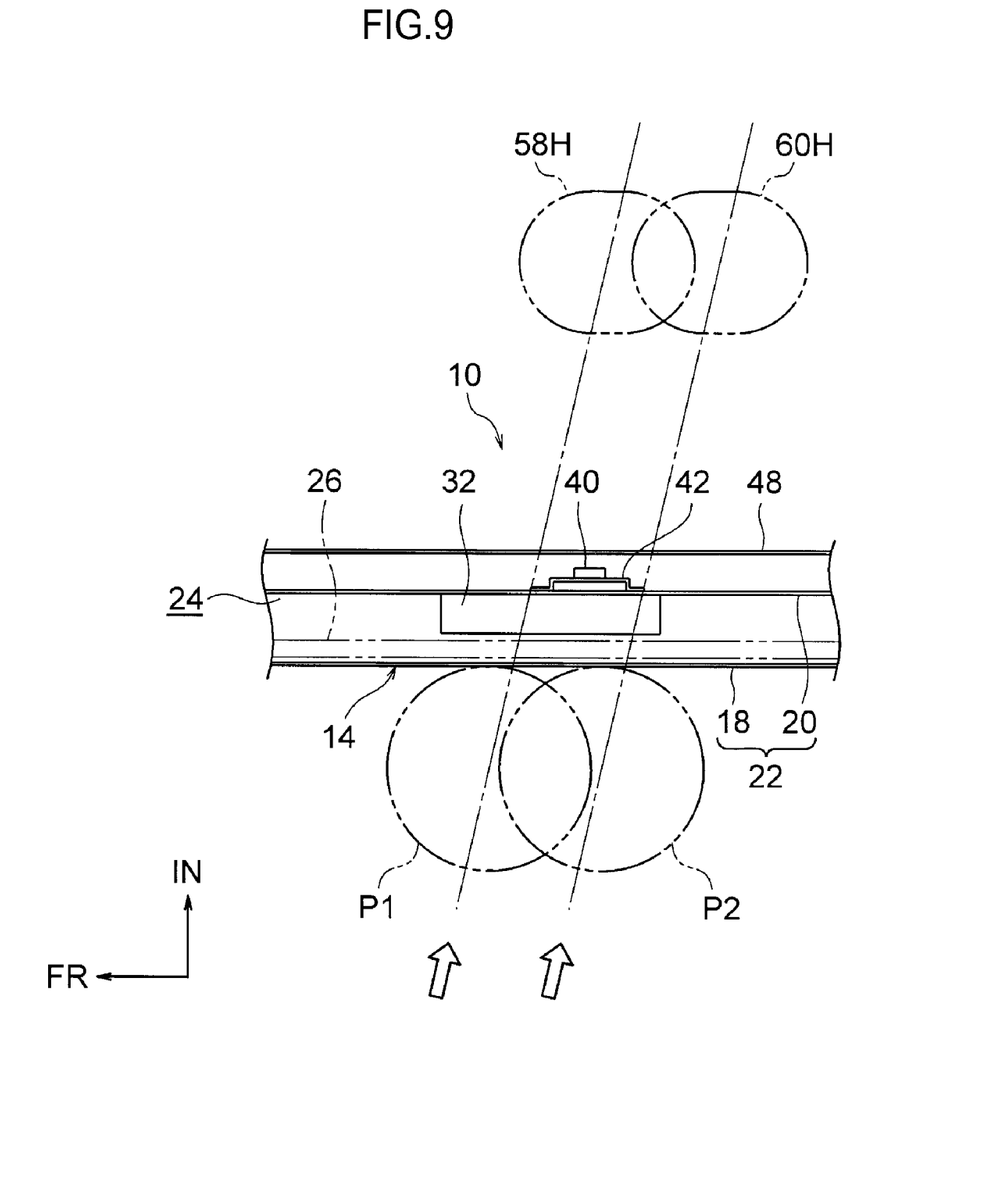
FIG. 9 is a horizontal cross-section for explaining the positional relationships between a sensing bracket according to the first exemplary embodiment of the present invention and a vehicle occupant.

Furthermore, in the present first exemplary embodiment, the sensing bracket 32 is disposed at the bottom side of the vehicle body and at the rear side of the vehicle body within the internal space 24 of the door main body 22. Therefore, irrespective of the frame of a vehicle occupant and the amount of seat sliding of the vehicle seat, the vehicle occupant can be effectively protected from a pole impact. Namely, in the present first exemplary embodiment, as shown in FIG. 8, when either a small framed vehicle occupant 58 is in the vehicle, or a large framed vehicle occupant 60 is in the vehicle, the sensing bracket 32 is disposed in the vicinity of the lumber region of the vehicle occupant 58 or 60. Consequently, as shown in FIG. 9, since both a pole P1 and a pole P2, which are heading towards the head 58H or 60H of the vehicle occupant 58 or 60, impact the sensing bracket 32, the impact load can be transmitted at an early stage to the acceleration sensor 40, via the sensing bracket 32. However, since the sensing bracket 32 does not extend as far as the vehicle body front side within the internal space 24, the weight of the side door 14 is appropriate, and not unnecessarily increased.

Furthermore, in the present first exemplary embodiment, a portion at the top of the outer-side joint section 32C of the sensing bracket 32 is the protruding portion 36, protruding out further towards the outer side in the vehicle width direction (the outer panel 18 side) than the bottom side of the outer-side joint section 32C. The vehicle width direction outer-edge portion of the horizontal section 32B is also disposed further to the outer panel 18 side than the bottom side of the outer-side joint section 32C (the portion joined to the pendent wall section 20C of the inner panel 20). As a result, when the outer panel 18 approaches the inner panel 20 side due to input of a localized load, such as from a pole impact or the like, the outer panel 18 can be made to impact with the vehicle width direction outer-edge portion of the horizontal section 32B at an early stage, and the load input to the acceleration sensor 40, via the horizontal section 32B, can be made at an early stage. Furthermore, the timing of load input to the horizontal section 32B can be adjusted by appropriately varying the protruding amount of the protruding portion 36 (the projection amount to the outer side in the vehicle width direction).

Furthermore, in the present first exemplary embodiment, the plural beads 38, which project out to the upper side of the vehicle body, are provided to the horizontal section 32B of the sensing bracket 32. The beads 38 extending along the vehicle width direction, and the rigidity of the horizontal section 32B against load in the vehicle width direction is raised by the beads 38. Consequently, since the transmission effectiveness of load via the horizontal section 32B can be raised, even with a thin sheet thickness for the sensing bracket 32, a reduction in weight of the sensing bracket 32 can be achieved.

Furthermore, in the present first exemplary embodiment, the upper side of the outer-side joint section 32C of the sensing bracket 32 is disposed so as to project out further to upper side of the vehicle body than the bottom wall section 20B of the inner panel 20, and the horizontal section 32B of the sensing bracket 32 is disposed separated from the bottom wall section 20B of the inner panel 20 towards the upper side of the vehicle body. Consequently, even when the acceleration sensor 40 cannot be disposed low, due, for example, to the relationship to the shape of the door trim 48 or the like, the horizontal section 32B and the inner-side joint section 32A of the sensing bracket 32 can be disposed in the vicinity of the acceleration sensor 40. As a result, the transmission effectiveness of load to the acceleration sensor 40, via the horizontal section 32B, can be raised. Furthermore, the rigidity of the sensing bracket 32 is raised by the outer-side joint section 32C extending further to the upper side of the vehicle body than the bottom wall section 20B of the inner panel 20. Consequently, a reduction in weight of the sensing bracket 32 can be achieved in comparison with cases where the thickness of sheet for the sensing bracket 32 is made thicker in order to secure rigidity.

Note that from the standpoint of securing rigidity of the sensing bracket 32, it is preferable to dispose the horizontal section 32B high. However, in cases of MDB impact, sometimes the outer panel 18, at a height around the vicinity of the center between the bottom edge portion of the outer panel 18 and the impact beam 26, intrudes to a large extend towards the inner panel 20 side. Therefore, from this standpoint the horizontal section 32B is preferably disposed low, in order to avoid impact between the intruded portion of the outer panel 18 and the sensing bracket 32. Consequently, the separation distance between the horizontal section 32B and the bottom wall section 20B is preferably set at, for example, 100 mm or less. Furthermore, in cases where sufficient sheet thickness (rigidity) of the sensing bracket 32 can be secured, the separation distance between the horizontal section 32B and the bottom wall section 20B may be set at 0 mm.

Explanation follows of a second exemplary embodiment of the present invention. Note that parts of the configuration and operation that are basically the same as those of the above first exemplary embodiment are allocated the same reference numerals to those of the above first exemplary embodiment, and explanation thereof is abbreviated.

Second Exemplary Embodiment

Figure 10:
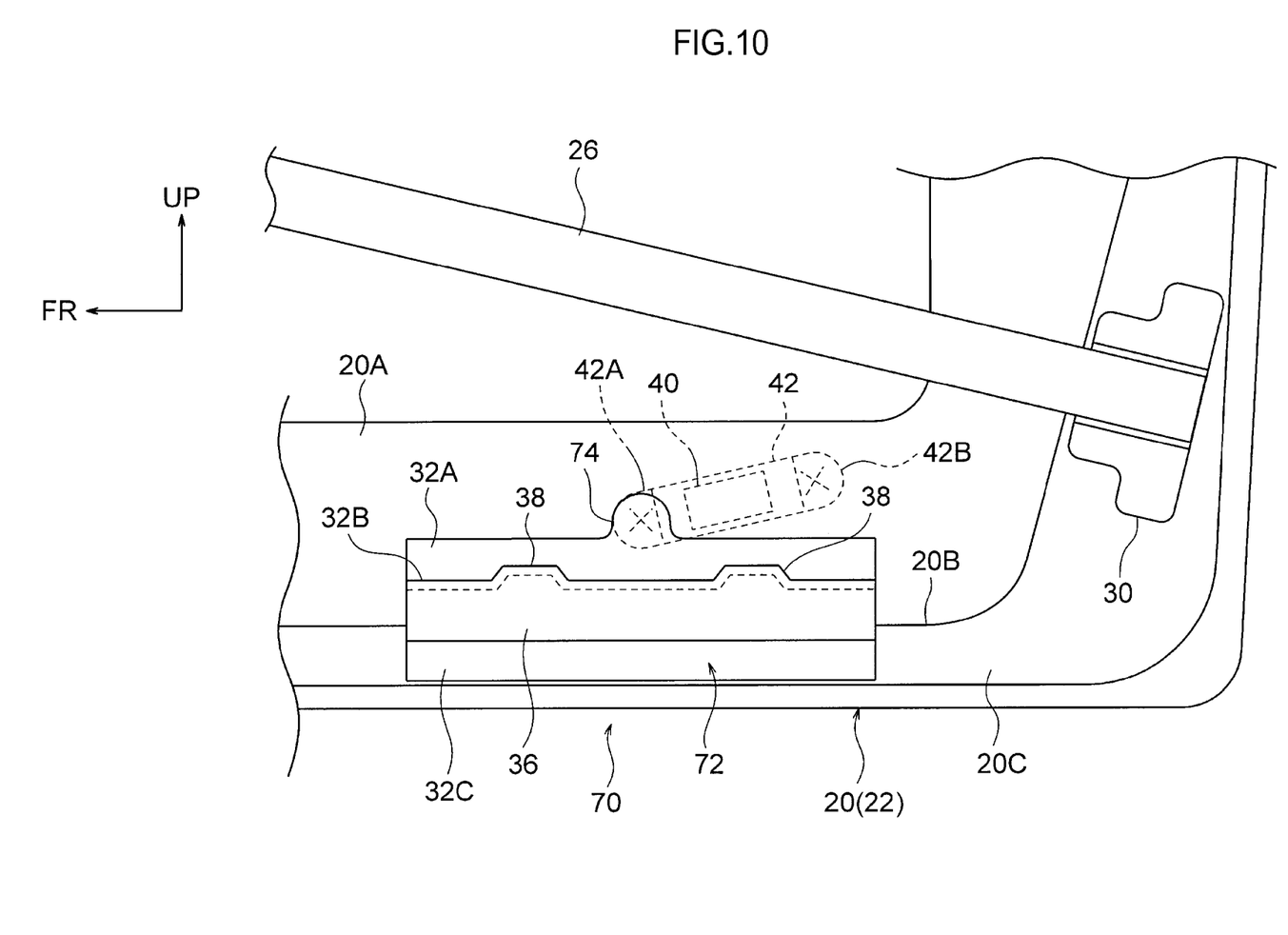
FIG. 10 is a schematic side view showing the configuration of relevant parts of a vehicle side door structure according to a second exemplary embodiment of the present invention.

FIG. 10 is a side view showing a configuration of relevant parts of a vehicle side door structure 70 according to the second exemplary embodiment of the present invention. In this exemplary embodiment, the configuration is basically the same as that of the first exemplary embodiment, however, in this exemplary embodiment, the configuration of a sensing bracket 72 serving as the load transmission member is different to that of the sensing bracket 32 according to the first exemplary embodiment.

The sensing bracket 72 is configured basically the same as the sensing bracket 32 according to the first exemplary embodiment, except that in the sensing bracket 72, a joint tab 74 is provided to the inner-side joint section 32A. This joint tab 74 is provided in the vicinity of the length direction central portion of the inner-side joint section 32A, and projects out at the top of the inner-side joint section 32A.

Furthermore, in the present exemplary embodiment, attachment bracket 42 of the acceleration sensor 40 is disposed inclined so as to become lower on progression towards the vehicle body front side. The front edge joining section 42A of the attachment bracket 42 is disposed on the opposite side of the joint tab 74 via the vertical wall section 20A of the inner panel 20. The front edge joining section 42A, the vertical wall section 20A, and the joint tab 74 are superimposed on each other in the sheet thickness direction of the vertical wall section 20A, with the three sheets joined together by spot welding in the superimposed state. Note that the attachment bracket 42 is not necessarily always provided inclined, and the placement orientation of the attachment bracket 42 may be appropriately varied according, for example, to the relationship to the placement space of the attachment bracket 42.

In the present exemplary embodiment, the transmission effectiveness of load to the acceleration sensor 40 is raised due to load input to the sensing bracket 72 being directly transmitted to the attachment bracket 42 of the acceleration sensor 40.

Note that while in each of the above exemplary embodiments, the sensing bracket 32 or 72 is configured equipped with the protruding portion 36 and the beads 38, the present invention is not limited thereto, and configuration may be made with one or other, or both, of the protruding portion 36 and/or the beads 38 omitted.

Furthermore, while in each of the above exemplary embodiments, examples are given with the acceleration sensor 40 provided as an impact detector, the present invention is not limited thereto. For example, an acceleration switch (one with a movable portion) that outputs an ON signal when acted on by an impact (acceleration) of a specific value or greater, or the like, may be employed in place of a detector that outputs a linear signal according to the acceleration.

Furthermore, in each of the above exemplary embodiments, the acceleration sensor 40 is configured attached to the inner panel 20 via the attachment bracket 42, however the present invention is not limited thereto, and configuration may be made with the acceleration sensor 40 directly attached to the inner panel 20.

Furthermore, in each of the above exemplary embodiments, the impact beam 26 is configured formed into a pipe shape, however the present invention is not limited thereto, and the shape of the impact beam may be appropriately varied. For example, configuration may be made with the impact beam formed into a hat-shaped cross-section. In such cases, for example, the extensions 28, 30 can be omitted, and the hat-shaped cross-section impact beam directly fixed, such as to the inner panel 20 or the like.

Various other modifications can be implemented within a range not departing from the spirit of the present invention. The scope of the rights of the present invention is obviously not limited by the above exemplary embodiments.

EXPLANATION OF THE REFERENCE NUMERALS

| | |
|---|---|
| 10 | vehicle side door structure |
| 12 | car (vehicle) |
| 14 | side door |
| 16 | car body |
| 18 | outer panel |
| 20 | inner panel |
| 20A | vertical wall section |
| 20B | bottom wall section |
| 20C | pendent wall section |
| 22 | door main body |

-continued

| | |
|---|---|
| 24 | internal space |
| 26 | impact beam |
| 32 | sensing bracket (load transmission member) |
| 32A | inner-side joint section |
| 32B | horizontal section |
| 32C | outer-side joint section |
| 36 | protruding portion |
| 38 | bead |
| 40 | acceleration sensor (impact detector) |
| 42 | attachment bracket (attachment member) |
| 70 | vehicle side door structure |
| 72 | sensing bracket (load transmission member) |

The invention claimed is:

1. A vehicle side door structure comprising:
a door main body having an internal space formed between an outer panel disposed at an outer side in a vehicle width direction and an inner panel disposed at an inner side in the vehicle width direction of the outer panel;
an impact detector attached to the inner panel;
an impact beam having a length direction along a vehicle body front-rear direction, disposed at an outer panel side in the internal space, with both end portions of the impact beam in a longitudinal direction of the impact beam fixed to the door main body; and
a load transmission member, having a length direction along the vehicle body front-rear direction, disposed at a bottom side of the vehicle body and at a rear side of the vehicle body in the internal space, the load transmission member comprising an inner-side joint section joined to the inner panel, a horizontal section extending from the inner-side joint section towards the outer side in the vehicle width direction, and an outer-side joint section extending from a vehicle width direction outer-edge portion of the horizontal section towards the bottom side of the vehicle body and joined to the inner panel, the vehicle width direction outer-edge portion of the horizontal section being disposed further toward the inner side in the vehicle width direction than a vehicle width direction outer-edge portion of the impact beam and facing the outer panel with a gap therebetween.

2. The vehicle side door structure of claim 1, wherein the inner panel comprises:
a vertical wall section joined to the inner-side joint section;
a bottom wall section extending from a bottom edge portion of the vertical wall section towards the outer side in the vehicle width direction and facing an underside of the horizontal section; and
a pendent wall section extending from a vehicle width direction outer-edge portion of the bottom wall section towards the bottom side of the vehicle body and joined to a bottom side of the outer-side joint section, and
an upper side of the outer-side joint section protruding out further to the outer side in the vehicle width direction than the bottom side of the outer-side joint section.

3. The vehicle side door structure of claim 1, wherein a bead is provided to the horizontal section, the bead extending along the vehicle width direction so as to form an undulation in a vehicle body vertical direction.

4. The vehicle side door structure of claim 1, wherein the inner panel comprises:
a vertical wall section joined to the inner-side joint section;
a bottom wall section extending from a bottom edge portion of the vertical wall section towards the outer side in the vehicle width direction and facing an underside of the horizontal section; and
a pendent wall section, extending from a vehicle width direction outer-edge portion of the bottom wall section towards the bottom side of the vehicle body and joined to a bottom side of the outer-side joint section, and
the horizontal section is disposed with a separation from the bottom wall section towards an upper side of the vehicle body, by an upper portion of the outer-side joint section being disposed projecting out further to the upper side of the vehicle body than the bottom wall section.

5. The vehicle side door structure of claim 1, wherein the impact detector is attached to the inner panel via an attachment member that is joined to a vehicle width direction inner face of the inner panel, with the attachment member, the inner panel, and the inner-joint section joined together and superimposed on each other in a sheet thickness direction of the inner panel.

* * * * *

UNITED STATES PATENT AND TRADEMARK OFFICE
CERTIFICATE OF CORRECTION

| | | |
|---|---|---|
| PATENT NO. | : 7,837,255 B1 | Page 1 of 1 |
| APPLICATION NO. | : 12/723965 | |
| DATED | : November 23, 2010 | |
| INVENTOR(S) | : Makoto Okutsu et al. | |

It is certified that error appears in the above-identified patent and that said Letters Patent is hereby corrected as shown below:

Column 1, lines 50-51 - delete "of claim 1"
Column 2, lines 10-11 - delete "recited in claim 1, when for example"
Column 2, lines 40-41 - delete "according to claim 2 is the vehicle side door structure of claim 1"
Column 2, line 53 - delete "recited in claim 2"
Column 3, line 45 - delete "recited in claim 5"
Column 5, line 17 - delete "according to claim 1"
Column 5, line 20 - delete "according to claim 2"
Column 5, line 23 - delete "according to claim 3"
Column 5, line 26 - delete "according to claim 4"
Column 5, line 29 - delete "according to claim 5"
Column 5, line 32 - delete "according to claim 6"
Column 5, line 36 - delete "according to claim 7"

Signed and Sealed this
Third Day of May, 2011

David J. Kappos
*Director of the United States Patent and Trademark Office*